US008495900B2

(12) United States Patent
Boegli

(10) Patent No.: US 8,495,900 B2
(45) Date of Patent: Jul. 30, 2013

(54) DEVICE FOR SATINIZING AND EMBOSSING PACKAGING FOILS

(75) Inventor: Charles Boegli, Marin-Epagnier (CH)

(73) Assignee: Boegli-Gravures S.A., Marin-Epagnier (CH)

( * ) Notice: Subject to any disclaimer, the term of this patent is extended or adjusted under 35 U.S.C. 154(b) by 219 days.

(21) Appl. No.: 13/001,248

(22) PCT Filed: Jun. 22, 2009

(86) PCT No.: PCT/CH2009/000214

§ 371 (c)(1), (2), (4) Date: Dec. 23, 2010

(87) PCT Pub. No.: WO2009/155720

PCT Pub. Date: Dec. 30, 2009

(65) Prior Publication Data

US 2011/0107804 A1 May 12, 2011

(30) Foreign Application Priority Data

Jun. 26, 2008 (CH) ....................................... 0969/08

(51) Int. Cl.

*B32B 3/00* (2006.01)
*A01J 21/00* (2006.01)
*A24F 15/00* (2006.01)
*B31F 1/07* (2006.01)
*B21D 13/04* (2006.01)

(52) U.S. Cl.

USPC ........................ 72/39; 72/196; 101/6; 101/23

(58) Field of Classification Search

USPC ...... 72/39, 196; 101/6, 23; 162/362; 428/156
See application file for complete search history.

(56) References Cited

U.S. PATENT DOCUMENTS 728,829 A * 5/1903 Arkell ........................... 425/369
4,280,978 A * 7/1981 Dannheim et al. ............ 264/156

(Continued)

FOREIGN PATENT DOCUMENTS

CA 2 382 597 A1 11/2000
DE 197 34 414 A1 2/1999

(Continued)

OTHER PUBLICATIONS

PCT International Search Report on application No. PCT/CH2009/000214 dated Aug. 31, 2009; 9 pages.

*Primary Examiner* — Dana Ross
*Assistant Examiner* — Onekki Jolly
(74) *Attorney, Agent, or Firm* — Foley & Lardner LLP

(57) ABSTRACT

The device for satinizing and embossing packaging foils comprises at least two embossing rollers that are each provided with a toothing consisting of individual teeth, the pyramidal teeth having an essentially rectangular horizontal projection, and the sides of the teeth being essentially parallel and perpendicular, respectively, to the longitudinal axis of the embossing roller. In contrast to the prior art, the opening angle (α) between the radially aligned adjacent tooth flanks is smaller than the opening angle (β) between the axially aligned adjacent tooth flanks, and the tooth height in the radial direction, measured from the tooth tip to the tooth bottom, is greater than the tooth height in the axial direction measured from the tooth tip to the tooth bottom. This dimensioning and arrangement of the teeth provides an improved gearing with a reduced specific pressure as well as an improved processing of the paper part of the foil that results in its better folding, curling, and tubing behavior.

12 Claims, 4 Drawing Sheets

U.S. PATENT DOCUMENTS 5,007,271 A * 4/1991 Boegli .......................... 72/196
6,176,819 B1 * 1/2001 Boegli et al. .................. 493/355
6,440,564 B1 * 8/2002 McLain et al. ................ 428/409
6,490,403 B2 * 12/2002 Bartenbach et al. .......... 385/147
6,715,411 B1 * 4/2004 Boegli .............................. 101/6
7,036,347 B2 5/2006 Boegli
7,147,453 B2 * 12/2006 Boegli .......................... 425/363
7,229,681 B2 * 6/2007 Boegli .......................... 428/156
7,426,886 B2 * 9/2008 Spatafora ........................ 101/23
8,038,922 B2 * 10/2011 Boegli .......................... 264/284
2004/0109911 A1 6/2004 Boegli
2005/0138981 A1 * 6/2005 Wilhelm ......................... 72/197
2005/0280182 A1 * 12/2005 Boegli .......................... 264/284
2007/0289701 A1 * 12/2007 Boegli .......................... 156/209
2008/0116610 A1 * 5/2008 Boegli .......................... 264/284
2009/0050001 A1 * 2/2009 Boegli .............................. 101/6

FOREIGN PATENT DOCUMENTS

EP 0 523 382 A2 1/1993
EP 1 925 443 A1 5/2008
WO WO 00/69622 11/2000
WO WO 02/076716 A1 10/2002

* cited by examiner

FIG. 1C
FIG. 1
FIG. 1B
FIG. 1A
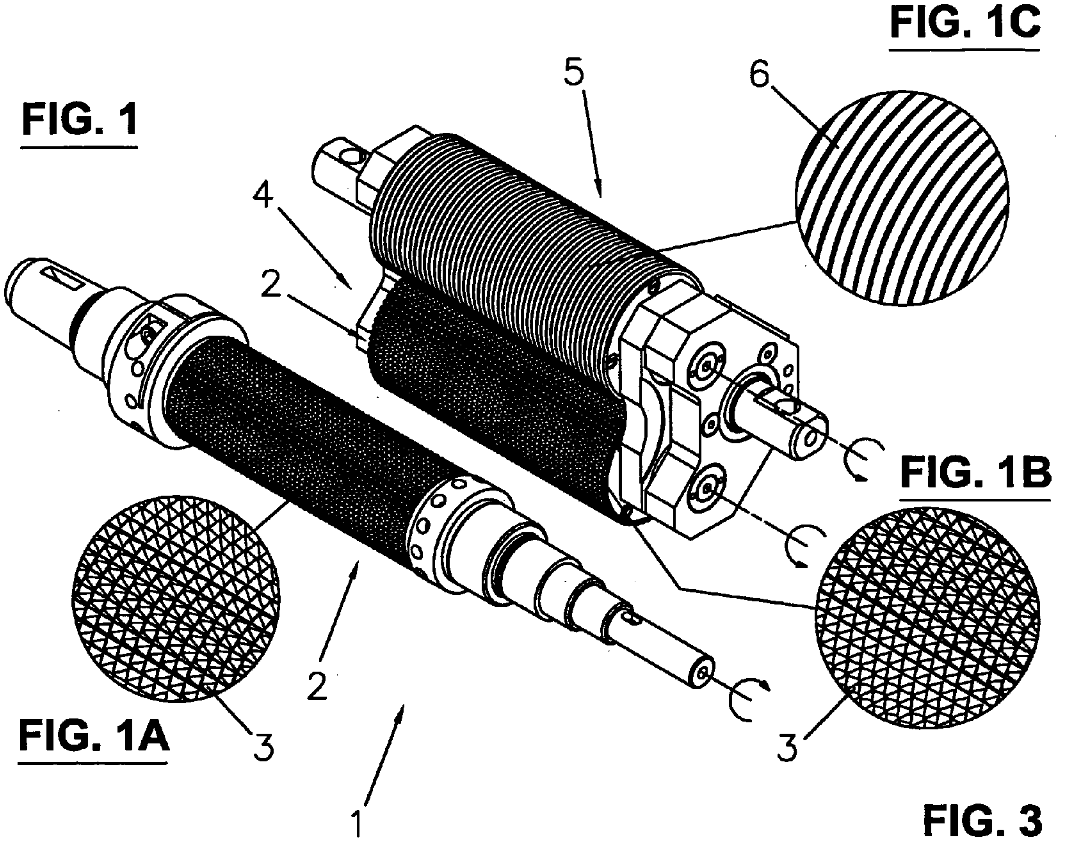
FIG. 2
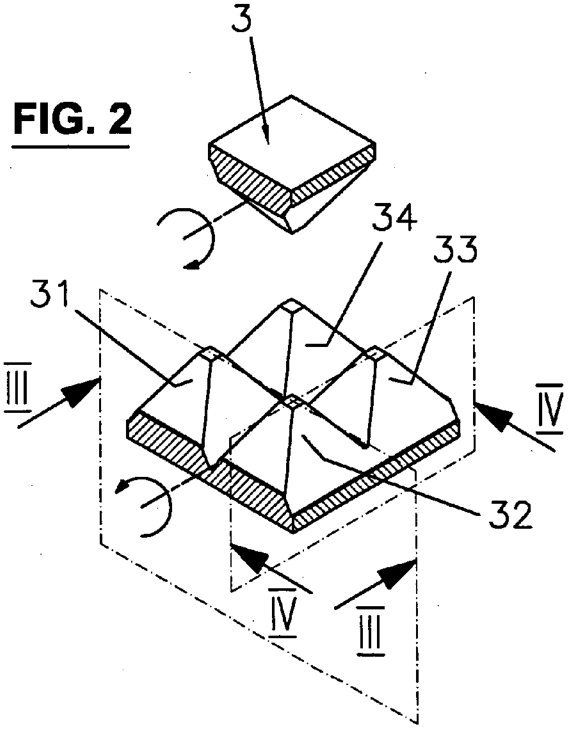
FIG. 3
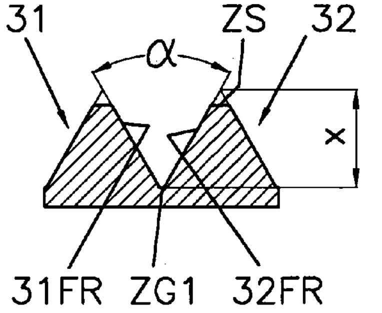
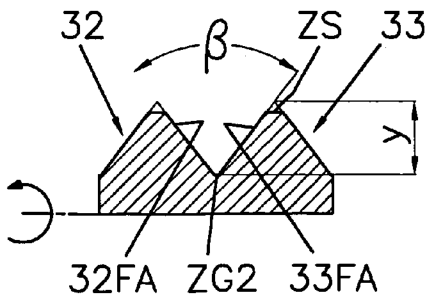
FIG. 4

FIG. 5
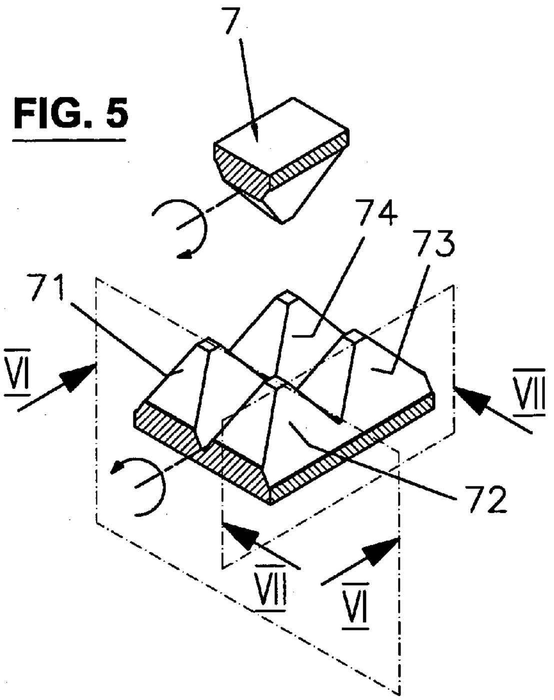
FIG. 6
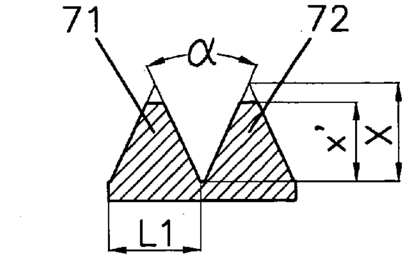
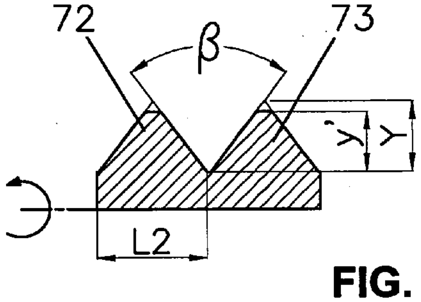
FIG. 7
FIG. 8
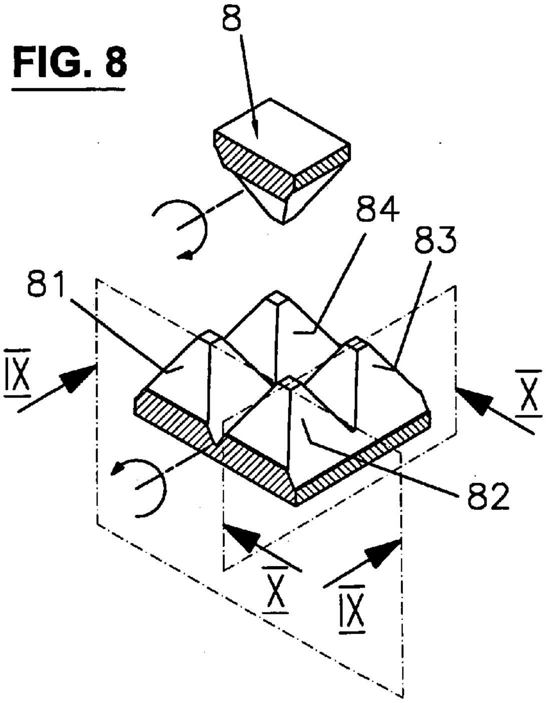
FIG. 9
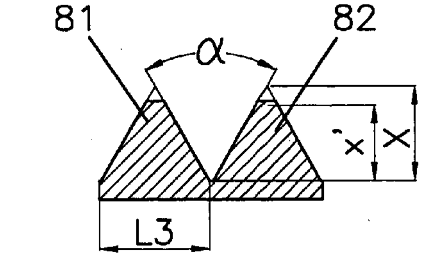
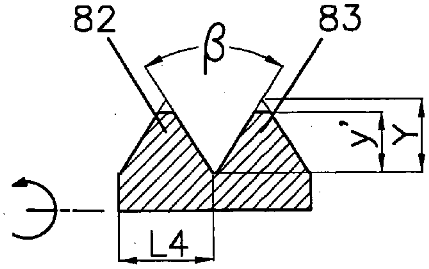
FIG. 10

FIG. 11
FIG. 11C
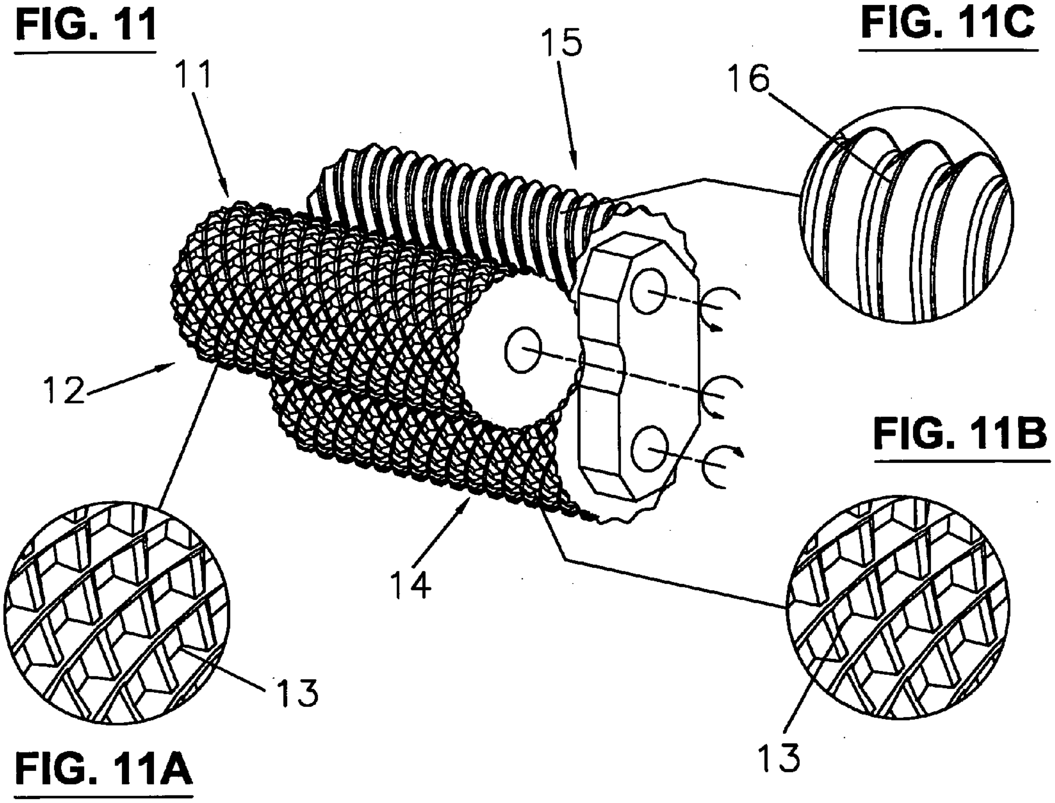
FIG. 11B
FIG. 11A
FIG. 13
FIG. 12
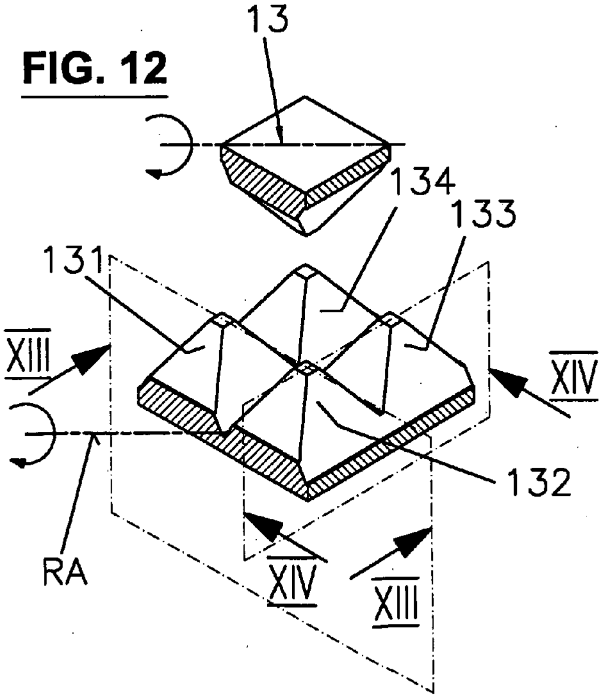
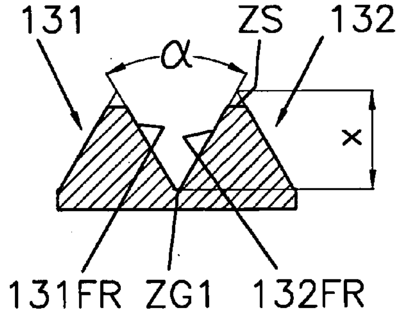
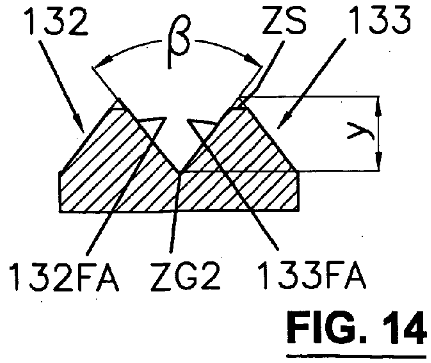
FIG. 14

FIG. 15
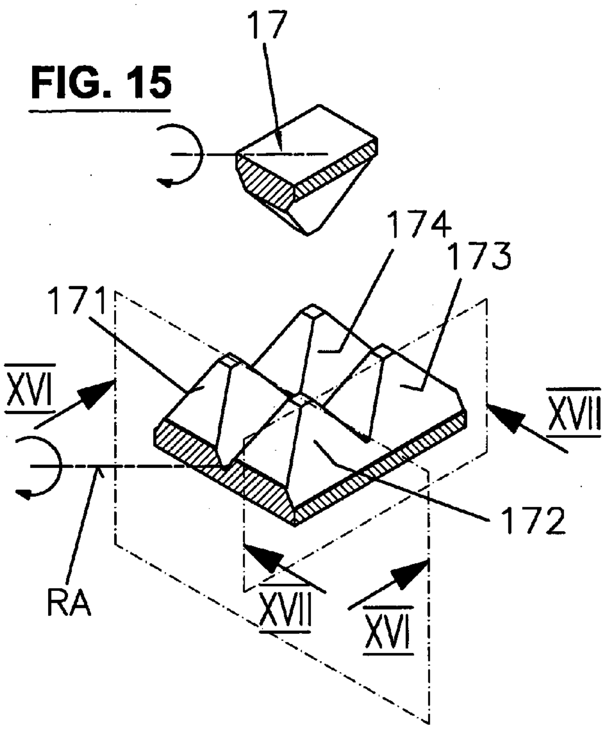
FIG. 16
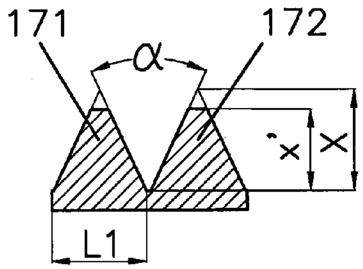
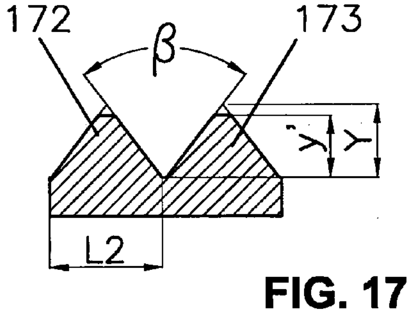
FIG. 17
FIG. 18
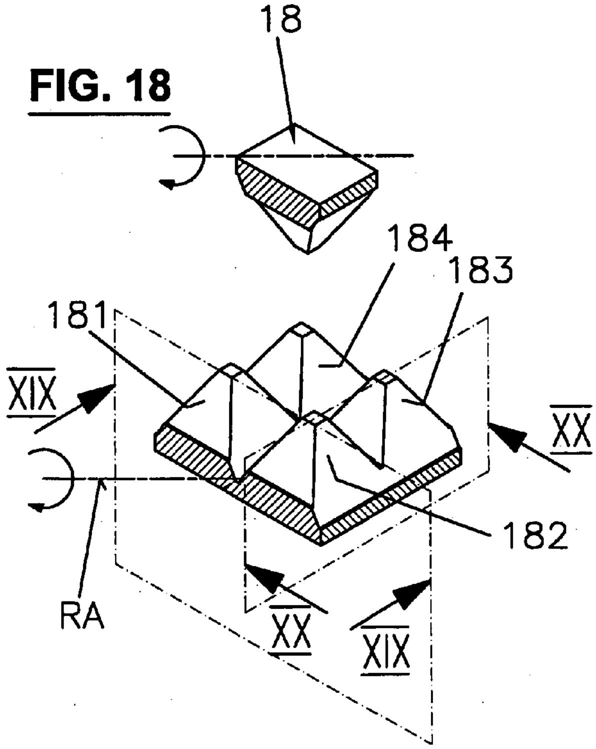
FIG. 19
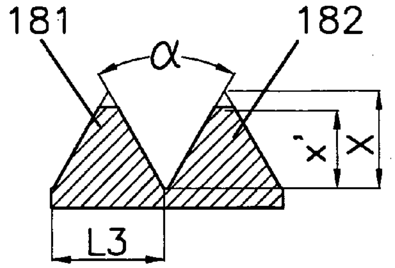
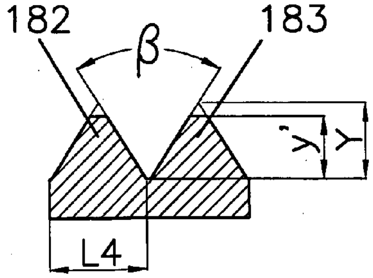
FIG. 20

DEVICE FOR SATINIZING AND EMBOSSING PACKAGING FOILS

CROSS-REFERENCE TO RELATED APPLICATION

This application is the National Phase of International Application No. PCT/CH2009/000214, filed Jun. 22, 2009, and published as WO 2009/155720 A1, which in turn claims priority to Switzerland Application No. 2008 969/08, the contents of these applications are herein incorporated by reference.

FIELD OF INVENTION

The present invention refers to a device for satinizing and embossing packaging foils, comprising at least two embossing rollers that are each provided with a toothing consisting of individual teeth, the paramidal teeth having an essentially rectangular horizontal projection.

BACKGROUND OF THE INVENTION

Such a device for satinizing and embossing packaging foils is known from WO 02/076716 A1 to the applicant of the present invention. According to some exemplary embodiments disclosed therein, e.g. according to FIGS. 6 to 9, the embossing device comprises three embossing rollers, two of which are provided with a toothing of regularly arranged teeth while the third roller has either longitudinal or transversal ribs. The modification of individual teeth for creating signs whose reflection varies according to the position of the observer is known from U.S. Pat. No. 7,036,347 to the applicant of the present invention.

The arrangement and the shape of the individual teeth are disclosed in different patents and patent applications to the applicant of the present invention, e.g. in U.S. Pat. No. 6,176,819, WO 00/69622, and in EP-A-1,925,443. The purpose of the individual teeth essentially consists in creating an appearance on the metallized or other surface of the packaging foil intended therefor that has become known under the term "satinizing". By eliminating teeth, the original surface is conserved in these locations, thereby allowing to create a logo and other such signs. Furthermore, by modifying individual teeth that are involved in the embossing process, however, signs may be created which may serve for identifying the content of the package.

All the aforementioned tooth shapes have in common that they are pyramidal and have an essentially square base, and that the opening angle between adjacent teeth has the same value both in the axial direction and in the radial direction.

In the references cited above, it is further disclosed that satinizing packaging foils not only serves for improving their esthetic appearance but also for treating the paper part of the packaging foil such that its fibers are broken in order to reduce or avoid a so-called memory effect and to achieve better overall folding properties. The term packaging foil encompasses metal-coated, metallized, printed, or otherwise surface-treated and light reflecting paper. The term "memory effect" denotes the backspringing of a fold under the action of the paper fibers which interferes with the subsequent processing of the packaging foil. Since the trend is to continuously reduce or entirely omit the metal layer, the mechanical behavior of the paper of the packaging foil becomes more and more significant for the subsequent procedure, i.e. the packaging of cigarettes, foods, or pharmaceutical products.

One of the possible improvements consists in reducing the distances between the individual teeth. In view of the already attained small dimensions of the teeth, a reduction of that distance below 0.3 mm is limited by the fact that the teeth generally also serve for driving the second embossing roller so that past a certain fineness of the teeth, there is a risk of slippage, particularly if the teeth are worn or the packaging foil has a great thickness.

SUMMARY OF THE INVENTION

On the background of this prior art, it is an object of the present invention to improve a device of the kind mentioned in the introduction in such a manner that a better effect upon the paper part of the packaging foil and thus a better folding behavior is achieved. This object is attained by the device wherein the opening angle ($\alpha$) between the essentially radially aligned adjacent tooth flanks is smaller than the opening angle ($\beta$) between the essentially axially aligned adjacent tooth flanks and that the tooth height in the radial direction, measured from the tooth tip (ZS) to the tooth bottom, is greater than the tooth height (Y) in the axial direction measured from the tooth tip to the tooth bottom.

BRIEF DESCRIPTION OF THE DRAWINGS

The invention will be explained in more detail hereinafter with reference to drawings of exemplary embodiments.

FIG. 1 shows in a first exemplary embodiment of the invention a part of a device in a perspective view, FIGS. 1A, 1B, and 1C show respective enlarged views of the surfaces of the embossing rollers, FIG. 2 schematically shows the shape and arrangement of teeth of embossing rollers in a perspective view and in a further enlarged view, FIG. 3 shows a section according to line III-III in FIG. 2, FIG. 4 shows a section according to line IV-IV in FIG. 2, FIG. 5 shows a variant of the schematic shape and arrangement of teeth in an enlarged perspective view, FIG. 6 shows a section according to line VI-VI in FIG. 5, FIG. 7 shows a section according to line VII-VII in FIG. 5, FIG. 8 shows another variant of the schematic shape and arrangement of teeth in an enlarged perspective view, FIG. 9 shows a section according to line IX-IX in FIG. 8, FIG. 10 shows a section according to line X-X in FIG. 8, FIGS. 11 to 20 show a second exemplary embodiment of the invention that is analogous to the first exemplary embodiment according to FIGS. 1 to 10.

DETAILED DESCRIPTION OF THE INVENTION

FIG. 1 shows one of the possible arrangements of the embossing rollers in the case where the device comprises three embossing rollers. The first embossing roller 1 is a driven roller which is always provided with a toothing 2 consisting of individual teeth 3. In the present case, embossing roller 1 cooperates with a second embossing roller 4 that is driven by the first embossing roller 1 and has no external driving means. This second embossing roller has the same toothing 2 with the same teeth 3 as first embossing roller 1.

The second embossing roller 4 cooperates with a third embossing roller 5 which, rather than individual teeth, has rings 6 which, in accordance with the shape of the teeth, are outwardly tapered and flattened so as to engage between the frustopyramidal teeth 3. Alternatively, instead of rings, longitudinal ribs may be used.

In FIGS. 1A and 1B, it is schematically shown that toothing 2 of embossing rollers 1 and 4 is composed of individual teeth 3 that are arranged in a regular basic grid. Furthermore, it follows from the references to the prior art cited above that the axle of second embossing roller 4 is not only resiliently pressed against the driving embossing roller 1 but also movably arranged in the other two coordinate planes such that the teeth of the second embossing roller may engage between the teeth of the first embossing roller in a self-synchronizing manner. Thereby, the two embossing rollers cooperate in the manner of gearwheels with or without paper and are therefore essentially rigidly coupled after the self-synchronization.

In the configuration shown in FIG. 1, neither a separate drive nor synchronizing means are required for the second embossing roller as the two embossing rollers are self-synchronizing. The third embossing roller provided with the rings is generally driven by the packaging foil. However, it is also possible for particular applications to use synchronizing means that are known per se, such as electronic parts, toothed belts, or gearwheels.

One of the inventively significant differences with respect to the prior art is the shape and arrangement of the teeth. The latter are pyramidal and have an essentially square or rectangular base, the flanks of the teeth of the first exemplary embodiment being essentially parallel and perpendicular, respectively, to the longitudinal axis of the embossing rollers. As further known from the prior art, the tips of the teeth are flattened.

As appears in FIGS. 3 and 4, the opening angles of the tooth flanks are different in the radial and axial directions. In the radial direction, i.e. according to section or in the driving direction, respectively, opening angle α between two adjacent flanks 31FR and 32FR of teeth 31 and 32 is smaller than opening angle β between the two axially aligned adjacent tooth flanks 32FA and 33FA of teeth 32 and 33.

The theoretical tooth height X, measured from the theoretical tooth tip ZS to tooth bottom ZG1, is greater than tooth height Y between theoretical tooth tip ZS and tooth bottom ZG2, these theoretical tooth tips ZS being located at the same distance from the rotational axis for all teeth and, for the present purposes, at the point of intersection of the tooth flanks. As mentioned, these are theoretical values that do not take account of manufacturing tolerances and of wear. In the present case, the practical tooth heights X' and Y' are indicated too, the difference X'-Y' being the same as for the theoretical tooth heights.

Due to the fact that in the driving direction, the maximum tooth height X is provided, the force transmission between the driving embossing roller and the following second embossing roller is fully effective. In the axial direction, according to plane IV-IV, no driving force has to be transmitted, and therefore a smaller tooth height is sufficient in this direction.

In this manner it is possible to reduce the minimum distance between the teeth, the result being a finer embossing and an improved processing of the paper of the packaging foil. For the embossing rollers of the prior art mentioned in the introduction, the minimum distances, i.e. the pitch, is approximately 0.3 mm for a tooth height of up to 0.5 mm. The present design of the teeth allows reducing the minimum distance down to 0.05 mm.

On this basis, a rectangular design of the tooth bases is possible while conserving the full driving force. Thus, according to FIGS. 5 to 7, length L1 of the base of tooth 7 or of teeth 71 to 74, respectively, in the radial direction is smaller than length L2 in the axial direction or, according to FIGS. 8 to 10, length L3 of the base of tooth 8 or of teeth 81 to 84, respectively, in the radial direction is greater than length L4 of this tooth in the axial direction. In this respect it will be noted that the lengths are only schematically depicted as only their difference is significant here.

Further variations are possible in that the tooth flanks and the bases do not have to be arranged in a strictly straight or rectangular shape but may alternatively be rounded or curved.

Opening angle α may be comprised in a range of 40° to 90° and angle β in a range of 60° to 120°, α always being smaller than β. The differences in tooth height, i.e. X-Y, may be comprised in a range of 0.02 to 0.43 mm.

Furthermore, it follows from FIG. 2 that in the arrangement according to FIG. 1, each tooth of one embossing roller engages between four teeth of the other embossing roller. However, this is not required for carrying out the invention; alternatively, an arrangement may be provided where each tooth of one roller engages in a corresponding recess in the other roller.

In FIGS. 11 to 20, a second exemplary embodiment of the invention is illustrated where the teeth having square or rectangular bases are not arranged in parallel or perpendicularly to the roller axes but form angle δ thereto.

In this exemplary embodiment, the angle δ is equal to 45°. The angle δ may be comprised in a range of greater than 0° to 89°, preferably in a range of 35° to 60°.

The three rollers 11 and 14 are each provided with a toothing 12 of individual teeth 13, and roller 15 is provided with rings 16 that may be continuous or discontinuous. Individual teeth 13 and rings 16 are of the same type as teeth 3 and ring 6, however form an angle δ to the roller axes.

In FIG. 12 it appears that teeth 131, 132, 133, and 134 have a square bases and form an angle of 45° with respect to the axis of rotation RA of the roller. Opening angles α and β as well as the theoretical and actual tooth heights X, X' and Y, Y' are defined in the same way as in the first exemplary embodiment.

In FIGS. 15 to 17, rectangular teeth 17, 171 to 174 are illustrated whose length L1 in the longitudinal direction is smaller than length L2 in the driving direction, and in FIGS. 18 to 20, rectangular teeth 18, 181 to 184 are illustrated whose length L3 in the longitudinal direction is greater than length L4 in the driving direction, the definition of the opening angles α and β again being the same as in the preceding exemplary embodiment.

The suggested solution provides various advantages:

1. Due to the reduced distance between the teeth, the embossed paper exhibits a very good behavior with regard to tubing and curling.
2. It is possible with this toothing to work with a drive without additional synchronizing means, but the latter are not excluded for special applications.
3. After the embossing process, the alterations of the packaging foil in the longitudinal direction are minimal, so that very little faults arise in the following folding operation and the packaging of the wrapped material, e.g. cigarettes, is not impaired. This is particularly true in the case of a three-roller system.
4. The specific pressure applied to the packaging foil may be reduced by approx. 25%, as compared to standard pyramids since a higher penetration depth needs a smaller pressure.
5. Due to the increased pressure in the radial direction, the paper fibers are broken much better, thereby resulting in improved folding properties.
6. The embossing rollers of the prior art that are not forcedly synchronized are rolling off on the foil as a coupling medium, the first driving roller driving the foil and the second embossing roller in turn being driven by the foil.

This may cause a slight slippage that influences the following processing. With the present toothing, the two embossing rollers cooperate in the manner of gearwheels with or without paper and are therefore essentially rigidly coupled after the self-synchronization.

7. The present embossing rollers are suitable for a very large range of packaging foils, e.g. for foils from 5 to 120 GSM total weight.
8. Due to the fact that the tooth heights are smaller in the axial direction, a dipping of the engraving roller at the location of the logos, i.e. where the teeth are absent, is reduced, i.e. there is no over-embossing of the edge areas.

The reduction of the distances between the individual teeth that is achieved by the toothing according to the invention not only results in a better processing of the packaging foil or of the paper part of the packaging foil, respectively, but also in an improved visual appearance of the satinized treated surface of the packaging foil. In addition, as disclosed in the cited prior art, further optical effects may be achieved by completely removing the corresponding teeth at the location of the intended logo on the driving embossing roller or, in order to produce a so-called shadow embossing where the created sign or image or the like variably reflects depending on the viewing angle, by modifying the corresponding individual teeth by a modification of their height, shape, or surface, or alternatively, as known from the prior art, by creating micro- or nanostructures on the tooth surface or on the flattened tooth tip, respectively, in order to produce authentication features that are generally indistinguishable by the naked eye.

Lately, moreover, foils are being used that are no longer provided with a metallized surface but with another treated light reflecting surface that is modified by the satinizing process so that a high-contrast logo is achieved by eliminating teeth in this case also.

In the exemplary embodiment according to the drawings, a device having three embossing rollers is depicted and described. The inventively significant properties of the arrangement of the teeth and their design are also applicable to an embossing device having two embossing rollers and of course also to an embossing device having more than three embossing rollers.

The invention claimed is:

1. A device for satinizing and embossing packaging foils, comprising at least two embossing rollers that are each provided with a toothing consisting of individual pyramidal teeth, the pyramidal teeth having an essentially rectangular horizontal projection, wherein an opening angle (α) between essentially radially aligned adjacent tooth flanks is smaller than an opening angle (β) between essentially axially aligned adjacent tooth flanks, and a tooth height (X) in a radial direction, measured from a tooth tip (ZS) to a tooth bottom (ZG1), is greater than a tooth height (Y) in an axial direction measured from the tooth tip (ZS) to a tooth bottom (ZG2).

2. A device according to claim 1, wherein sides of the teeth are aligned essentially parallel or perpendicular to a longitudinal axis of the embossing roller, respectively.

3. A device according to claim 1, wherein sides of the teeth form an angle (δ) of greater than 0° up to 89° with a longitudinal axis of the embossing roller, or perpendicularly thereto, respectively.

4. A device according to claim 1, wherein the smaller opening angle (α) is comprised in a range of 40° to 90° and the greater opening angle (β) in a range of 60° to 120°, α always being smaller than β.

5. A device according to claim 1, wherein for a tooth height of up to 0.5 mm, a tooth height difference is comprised in a range of 0.02 to 0.43 mm.

6. A device according to claim 1, wherein each tooth of one of the embossing rollers is located between four teeth of the other embossing roller.

7. A device according to claim 1, wherein a base of an individual tooth is square.

8. A device according to claim 1, wherein a base of an individual tooth is rectangular.

9. A device according to claim 1, comprising further a third embossing roller having a surface structure without individual teeth.

10. A device according to claim 9, wherein the surface structure of the third embossing roller comprises rings or longitudinal ribs that are arranged in a continuous or discontinuous manner.

11. A device according claim 1, wherein the second embossing roller is journalled such as to be capable of an excursion in a longitudinal direction of an axle, in a direction of a contact pressure, in a travelling direction of a material that is to be embossed or a combination thereof

12. A device according to claim 1, wherein individual teeth of one of the two embossing rollers are modified in height or shape in order to produce embossed signs whose appearance varies depending on the viewing angle.

* * * * *